United States Patent Office.

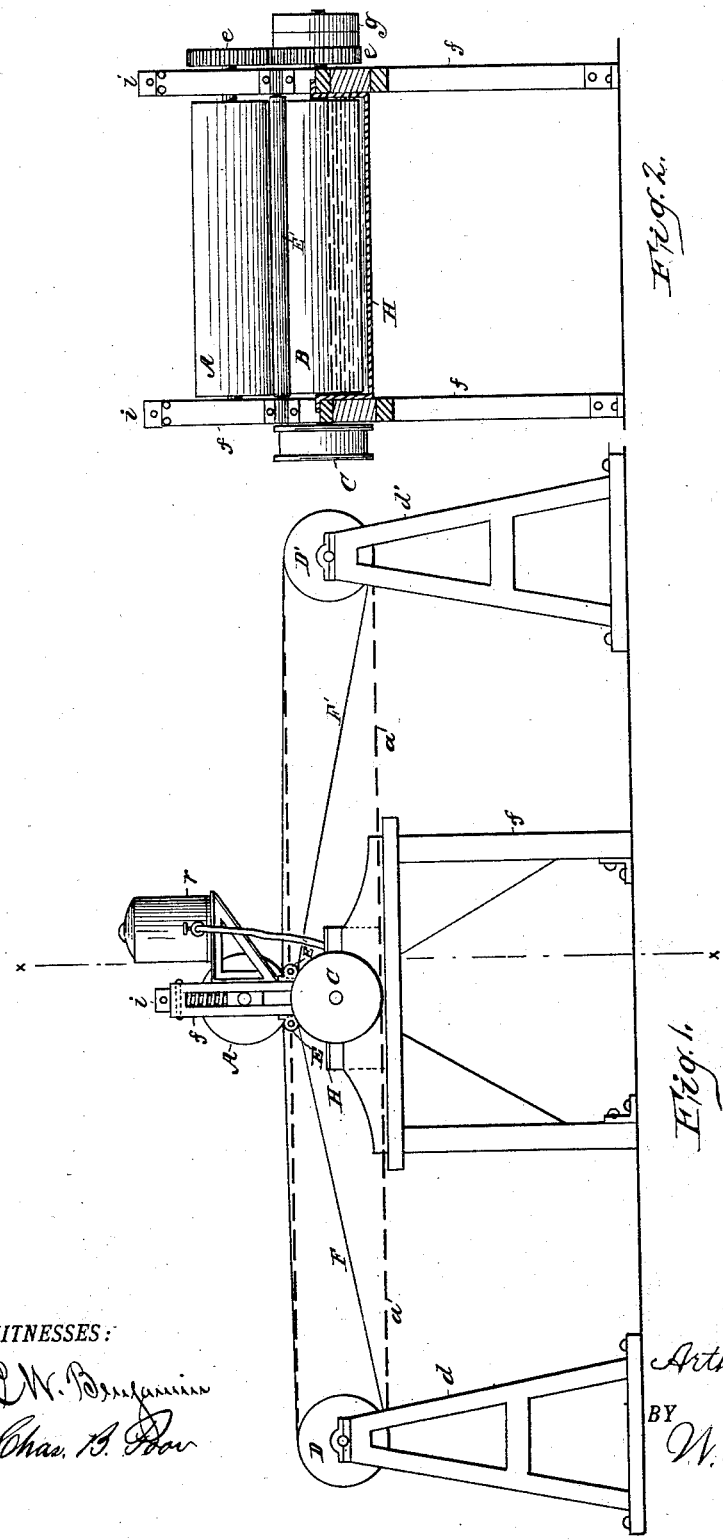

ARTHUR CLIFTON SQUIRES, OF COLLEGE POINT, NEW YORK, ASSIGNOR TO ISAAC B. KLEINERT, OF SAME PLACE.

VULCANIZING-MACHINE.

SPECIFICATION forming part of Letters Patent No. 375,017, dated December 20, 1887.

Application filed January 28, 1887. Serial No. 225,756. (No model.)

*To all whom it may concern:*

Be it known that I, ARTHUR CLIFTON SQUIRES, a citizen of the United States, residing at College Point, in the county of Queens and State of New York, have invented a new and useful Vulcanizing-Machine, of which the following is a specification.

Rubber when first spread upon fabrics and similar goods is in a soft, plastic, and wholly inelastic condition, and in order to render it firm and elastic it is necessary to subject the rubber to a further process, known as "vulcanization." This may be effected by various methods, one of which consists in treating the rubber with a liquid chemical which produces the desired change in the properties of the rubber.

My invention relates to a machine for applying this chemical vulcanizing-liquid to goods or fabrics which have been previously coated with rubber, in order to vulcanize the rubber contained in or upon them. Heretofore the chemicals have been applied by hand, by means of brushes, and the process was both slow and very disagreeable, on account of the fumes arising from the chemicals.

The object of my invention is to avoid these objections by a machine which will treat the goods with the vulcanizing-liquid rapidly and thoroughly, while the operator is removed to a distance from the chemical bath. These objects I attain by the apparatus shown in the accompanying drawings, wherein—

Figure 1 is a side elevation of the complete machine, and Fig. 2 is a transverse view, partly in section, through the line $x\,x$ in Fig. 1.

Two rollers, A and B, are mounted in a frame, $f$. The lower one, B, revolving in fixed bearings, dips to nearly half of its diameter in a vat, H, placed below it, which is kept full of the vulcanizing-liquid, being fed from a reservoir, $r$, which may be placed at any convenient point. The top roll, A, is hung in movable bearings, which can be raised or lowered vertically in the frame $f$ by means of the screws $i\,i$. These rolls are made either of wood or metal, and are caused to work in unison by the gear-wheels $e\,e$. At each side of the rolls A B are endless aprons F and F', which pass, respectively, over drive-rolls D and D', which are carried by stands $d$ and $d'$, placed at any convenient distance from the main rolls A B and the vat H, and the small rolls E and E', which work in close to the junction between A and B.

The operation of my improved machine is as follows: The vat H being filled with the liquid vulcanizing agent and motion being communicated to the rolls and aprons through the pulley C, the articles to be treated are placed on the apron F, which delivers them between the rolls A and B, where they are brought in contact with vulcanizing agent, which is constantly carried up by the roll B, which is partly immersed in it. The roll A is so adjusted as to remove the surplus liquid, but not to exert any great amount of pressure upon the goods passing. From the rolls A B the goods are received upon the second apron, F', which conveys them away to any desired place, and which may be long enough to allow the articles to become dry before reaching the end of the apron. The aprons are made of some strong fabric, and coated on both sides with rubber, in order that they may resist the chemicals employed in the process.

What I claim, and desire to secure by Letters Patent, is—

In a machine for vulcanizing fabrics containing rubber, the combination of the vat H, containing the vulcanizing-solution, and the roll B, partly immersed therein, with the pressure-roll A, and traveling aprons F and F', operated by the rolls D E and D' E', and arranged to deliver the articles to be treated between said rolls and to receive and carry the articles away from the rolls after treatment, as herein described.

ARTHUR CLIFTON SQUIRES.

Witnesses:
    WILLIAM SUTTER,
    JOSEPH V. SMITH.